United States Patent [19]

Sjotun et al.

[11] 4,267,775
[45] May 19, 1981

[54] ARRANGEMENT IN RAM AIR TURBINES

[75] Inventors: Kyrre Sjøtun; Tore Rognmo, both of Kongsberg, Norway

[73] Assignee: A/S Kongsberg Våpenfabrikk, Norway

[21] Appl. No.: 956,577

[22] Filed: Nov. 1, 1978

[30] Foreign Application Priority Data

Nov. 2, 1977 [NO] Norway ................................ 773755

[51] Int. Cl.³ .............................................. F42C 11/00
[52] U.S. Cl. ................................... 102/208; 244/53 B; 244/58
[58] Field of Search .................. 102/208; 290/44, 52, 290/55; 244/53 B, 58, 78, 130, 207; 416/91; 417/315

[56] References Cited

U.S. PATENT DOCUMENTS

| | | | |
|---|---|---|---|
| 2,468,120 | 4/1949 | Senn | 102/208 |
| 2,939,017 | 5/1960 | Teague | 290/44 |
| 3,624,751 | 11/1971 | Dettling | 244/53 B |
| 3,826,193 | 7/1974 | Rognmo | 102/208 |
| 4,002,123 | 1/1977 | Fisher | 102/208 |
| 4,161,371 | 7/1979 | Sheppa | 102/208 |

FOREIGN PATENT DOCUMENTS 66880  1/1940  Czechoslovakia ............... 244/53 B

*Primary Examiner*—Donald P. Walsh
*Attorney, Agent, or Firm*—Holman & Stern

[57] ABSTRACT

The nose portion of a missile having a ram air turbine for driving an electric generator for supplying electric power to the electric circuits of the missile, especially of its fuse, is designed in a special manner in order to provide, at high missile speeds, a throttling of the air flow, whereby the speed of rotation of the turbine may be kept within reasonable limits. Thus, the air inlet is divided in a plurality of inlet ducts arranged as a wreath around the foward end of the missile. Further, the outlet openings are forwardly directed and co-operate with the shock waves from the acute forward end of the missile and from an annular edge surrounding the wreath of inlets but lying radially inside the outlet openings.

1 Claim, 2 Drawing Figures

ARRANGEMENT IN RAM AIR TURBINES

BRIEF SUMMARY OF THE INVENTION

The present invention relates to an arrangement in ram air turbines for driving an electric generator in missiles, in which ram air is supplied to the turbine wheel through an axial inlet positioned at the forward end of the missile and surrounded by a forwardly protruding annular edge and leaves the missile through discharge openings at the periphery of the missile outside the annular edge, the forward end of the missile inside the annular edge being conical with an apex protruding forwardly of the annular edge.

A typical characteristic of ballistic missiles is that the velocity along the trajectory may vary strongly depending on the firing angle. Additionally, in certain types of missiles there is a variation in velocity because of a corresponding variation in the discharge velocity of the missile. Thus, the total variation in velocity for such types of missiles may be rather large.

When using ram air driven turbine generators for continuous supply of electric power to such missiles in their trajectories the said variation in missile velocity may constitute a problem, especially when the ratio between the highest and the lowest velocity is greater than 4:1 and the maximum velocity is high. It may for instance be desirable to obtain satisfactory conditions at missile speeds in the range from 150 to 1000 m/s. On one hand it is desirable at the lowest missile velocity to obtain an effect from the electric power supply which is sufficient for the electric circuits in the missile to function. In order to achieve this the turbine must obtain a certain minimum speed of rotation as soon as possible. On the other hand the speed of rotation should not be too high at the highest missile speeds. Since the aerodynamic heating at supersonic speeds is rather great it is desirable to limit the rotation of speed by controlling the flow of air through the turbine.

DESCRIPTION OF THE PRIOR ART

It is known automatically to control the flow of ram air through turbine aggregates. The control operation should preferably not require movable parts.

In U.S. Pat. No. 2,701,526 an attempt to solve the problem has been made by passing the ram air to the turbine through a duct having flexible walls. The duct is surrounded by a chamber having a number of openings for balancing the air pressure therein. The idea is based on the Bernoulli effect according to which an increase in the air speed along a surface results in a reduced static pressure on the surface. Accordingly, when the velocity of the missile and thereby the velocity of the ram air is increased, the ducts through which the ram air is passed to the turbine, will be reduced in cross section, the duct walls being flexed inwardly. The amount of air supplied to the turbine wheel will then be reduced. The solution is not satisfactory for rotating missiles, since the centrifugal force will counteract the tendency otherwise resulting from an increasing missile speed towards reduction of the cross section of the duct. Further, it is difficult to provide a satisfactory material for the flexible ducts if a sufficient flexibility is to be obtained in a reasonable temperature range.

U.S. Pat. No. 2,804,824 illustrates a ram air driven turbine in which the discharge opening has a smaller cross section than the inlet opening. The intention is that the ram air pressure at supersonic speeds of the missile shall maintain the velocity of the air discharged from the outlets at the velocity of sound. Since the velocity of the air cannot be greater than the velocity of sound the intention is that a further increase of the missile velocity will not be reflected in an increased turbine velocity. However, the effect of the fact that the density of the throughflowing air will increase with increasing velocity beyond the velocity of sound has been ignored. The result is that the rotational speed of the turbine will still increase relatively strongly also at supersonic speeds of the missile, a fact which strongly detracts from the value of the solution suggested. This is especially true if it is desirable for the turbine to reach an acceptable speed of rotation also at low velocities of the ram air.

In U.S. Pat. No. 2,468,120 there is disclosed a turbine generator for missiles in which the turbine wheel is positioned relatively far back in the fuse. Thereby, comparatively long paths of movement for the ram air to the turbine and back to the discharge outlet are obtained, the air after having passed the turbine wheel being reversed approximately 180° and passed axially forwardly through the missile whereupon it is again reversed 180° and discharged through rearwardly directed openings. The freely flowing air outside the missile will flow past these discharge openings and generate a suction or ejector effect. At increasing missile velocities the negative pressure in the discharge openings is increased, whereby more air is drawn through the turbine. Actually, the reason for the structural features disclosed in this patent specification is not a desire of throttling the flow of air at high velocities, but primarily a desire of positioning the turbine and the generator well protected within the missile rearwardly of the electronic unit which is protected by a cap at the forward end.

As an example of how it is possible to control the speed of a turbine by using movable parts reference is made to U.S. Pat. No. 3,382,805.

SUMMARY OF THE INVENTION

The object of the present invention is to design the inlets as well as the outlets for ram air in such a way that without resorting to movable parts a desired minimum speed of rotation is obtained even at low missile velocities, the speed of rotation at very high missile velocities still not becoming unduly high.

In order to achieve this the arrangement according to the invention is characterized in that the inlet is divided in a plurality of inlet ducts arranged as a wreath around the conical forward end and that the discharge openings are forwardly directed and positioned ajacent the annular edge.

An embodiment of the invention will be described in the following, reference being had to the drawings.

DETAILED DESCRIPTION

Figure 1:
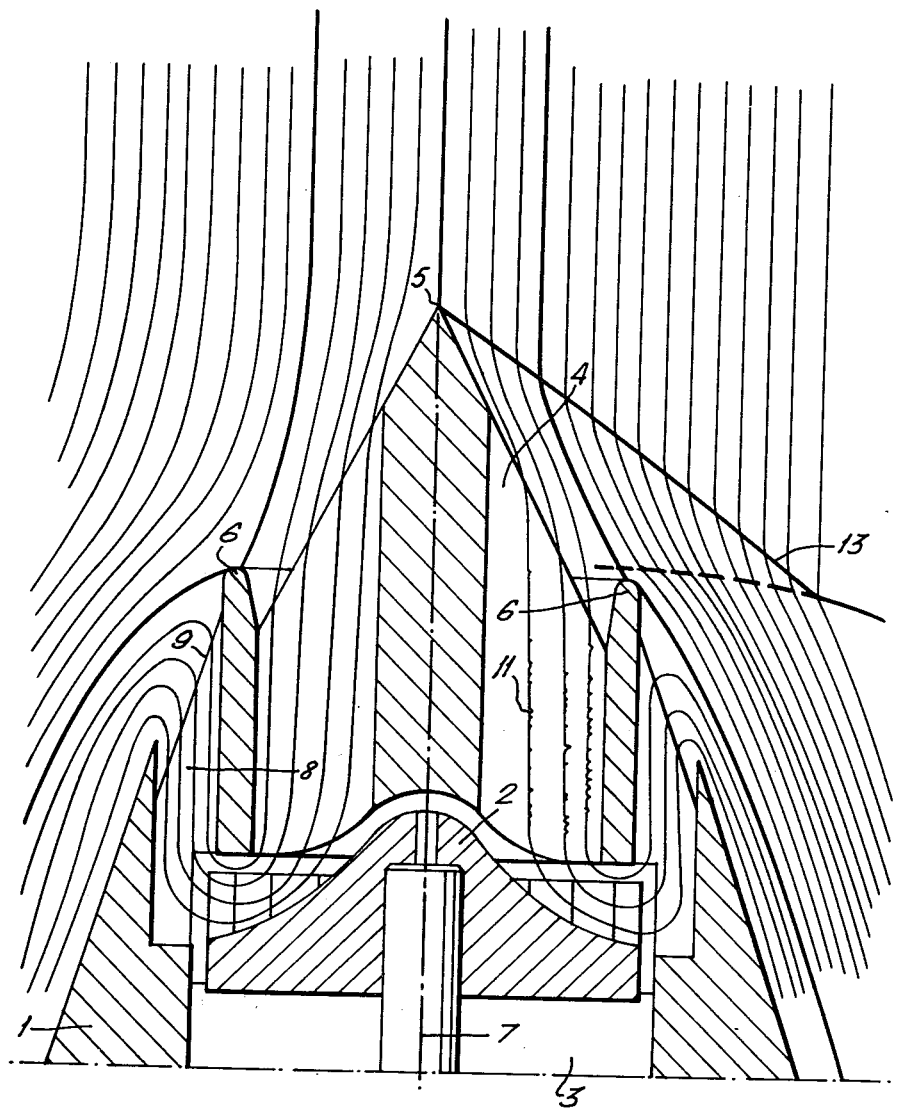
FIG. 1 is a longitudinal section through the nose portion of a fuse with lines of flow indicated.

The nose portion of the fuse shown in the drawing consists of an outer shell or housing 1 surrounding a ram air driven turbine wheel 2. The turbine wheel 2 drives an electric generator 3 which will not be further described, since it is of conventional design and thus without significance for the invention. The nose portion of the fuse is conical with an acute forward end 5 arround which six axial inlet openings or ducts 4 for ram air are provided. The inlet openings 4, which are arranged as a wreath, are surrounded by a annular edge 6 which protrudes forwardly in the direction of movement of the missile and is concentric with the axis 7 of the missile. The annular edge intercepts the ram air and leads it to the inlet ducts 4. Radially outside the inlet ducts 4 there are provided discharge ducts 8 which also extend axially and end in forwardly directed discharge openings 9.

In FIG. 1 also some lines of flow have been indicated which will be explained below while explaining the mode of operation of the arrangement according to the invention.

As indicated the ram air will be intercepted by the annular edge 6 and passed to the turbine wheel 2 through the ducts 4. The cross sectional area of the ducts 4 is so adapted to the cross sectional area of the discharge openings 9 that a sufficient speed of rotation is obtained already at low ram air speeds. The lines of flow to the left of the axis 7 of the missile illustrate the air flow at a low subsonic velocity of the missile.

Figure 2:
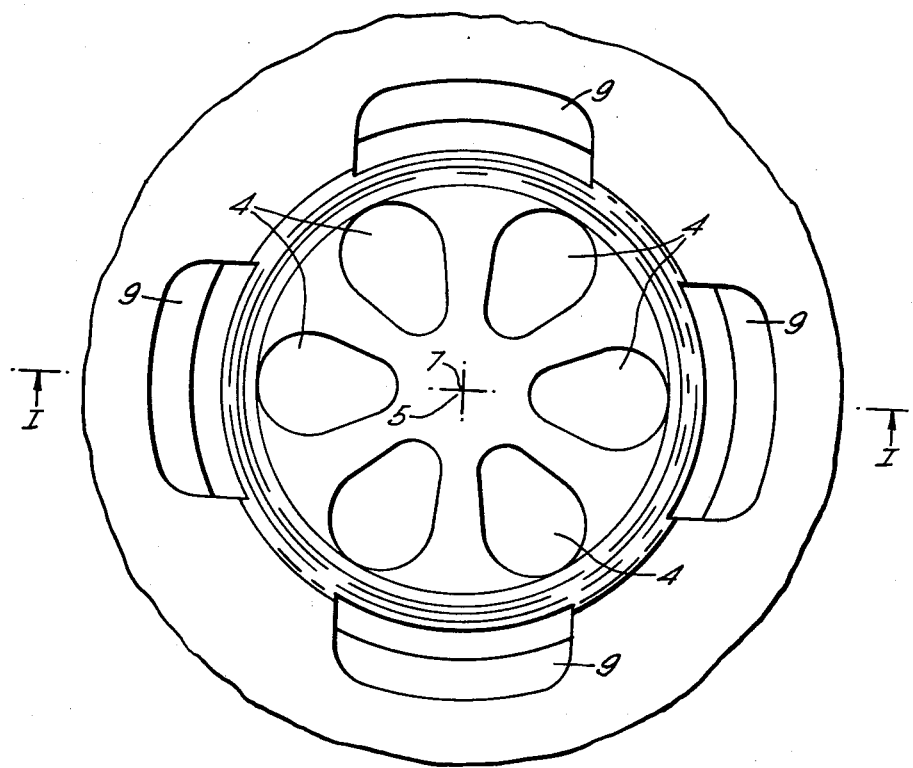
FIG. 2 illustrates the nose portion in FIG. 1 viewed from its forward end.

Already at average ram air velocities an intended turbulence (indicated at 11) arise in the inlet ducts 4, which turbulence reduces the effective flow of air. Such turbulence will be generated earlier (that is at lower air velocities) in a wreath of ducts 4 than in a single annular duct, such as an inlet duct as disclosed in U.S. Pat. No. 2,468,120. The reason therefor is that the Reynold's number of a flow through the duct 4 illustrated in FIG. 2 is higher than of a flow through an annular duct having the same cross section and approximately the same boundary surface and thereby approximately the same rate of flow at low speeds. This is especially true at velocities at which the flow in ducts according to FIG. 2 becomes turbulent, whereas the flow in an annular duct would still be laminar. It is well known that the frictional losses in a flow is much higher with turbulent boundary layers than with laminar boundary layers. Since turbulent boundary layers are also thicker than laminar boundary layers, a throttling of the inlet may occur earlier when the inlet ducts are designed as illustrated in FIG. 2. Sooner or later a maximum inlet velocity is obtained which cannot be increased, whereby an upper speed limit for the turbine is obtained. Additionally, the contact surface in the inlet has a cooling effect, whereby the total heat flow is reduced.

The discharge ducts 8 are shaped so that the discharged air is passed forwardly towards the freely flowing ram air outside the missile. The discharged air must then be deflected by an angle which is governed by the velocity of the freely flowing air. This deflection results in an increase in the pressure in the outlet and thereby a reduction of the ratio between the pressure at the inlet and the pressure at the outlet, whereby the amount of air flowing through the turbine will be gradually reduced due to a throttling of the outlet. This effect is further enhanced at supersonic speeds, since the shock wave from the annular edge 6 and the shock wave 13 from the apex 5 approach the nose shell as the velocity increases. Thereby, a further throttling of the outlet is obtained, which in turn results in a full flattening out of the characteristic curve for the speed of rotation of the turbine. The lines of flow to the right of the axis 7 in FIG. 1 illustrates the flow formation at a high supersonic velocity of the missile.

The design according to the invention results in a substantially lower speed of rotation at the highest missile velocities than what would have been the case without the invention, a further increase of the missile velocity not resulting in any substantial increase in the speed of rotation of the turbine. Thus, the maximum speed of rotation of the turbine may be kept at approximately 270.000 rpm, whereas with discharge and inlet design as illustrated in U.S. Pat. No. 2,468,120 a speed of rotation of approximately 450.000 rpm must be expected.

Besides the design of the inlet and discharge ducts the geometry of the remaining part of the nose portion is important. Thus, the apex 5 provides a beneficial shock wave 13 for the flow while at the same time reducing the air temperature and density at supersonic speed. The apex 5, which in FIG. 1 is shown as protruding relatively far in front of the annular edge, may be shorter or longer if the maximum missile velocity is different. The annular edge 6 intercepts the air over a relatively large area and ensures a sufficient supply of air to the turbine wheel also at low speeds. The provision of several separate openings or ducts 4 instead of a single opening gives a larger throttling effect at higher air velocities than a single opening having the same cross sectional area. At the same time the division of the inlet as taught by the invention leads to a better cooling of the air. The forwardly directed discharge openings 9 entail that the flow of air is gradually restricted at minimum and high velocities. Finally, the position of the forwardly directed discharge openings 9 relative to the annular edge 6 and the shock wave at supersonic speeds is beneficial since it contributes to a further throttling.

We claim:

1. An arrangement in ram air turbines for driving an electric generator in a missile, in which ram air is supplied to the turbine wheel through an axial inlet positioned at the forward end of the missile which is surrounded by a forwardly protruding annular edge and leaves the missile through discharge openings at the periphery of the missile outside the annular edge, the forward end of the missile inside the annular edge being conical with an apex protruding forwardly of the annular edge, characterized in that: the inlet is divided into a plurality of inlet ducts arranged in circular spaced relationship around the conical forward end and that the discharge openings are forwardly directed and positioned immediately adjacent said annular edge, the position of said discharge openings being located with respect to said annular edge to co-operate with the air flowing over said forward end and over said discharge openings at subsonic speeds and the shock waves produced at said forward end at supersonic speeds to effectively limit the flow of air through the turbine and the turbine speed at high missile velocity.

* * * * *